Oct. 21, 1941.  E. J. SWEETLAND  2,259,712
BED WARMING MEANS
Filed April 11, 1939  2 Sheets-Sheet 1
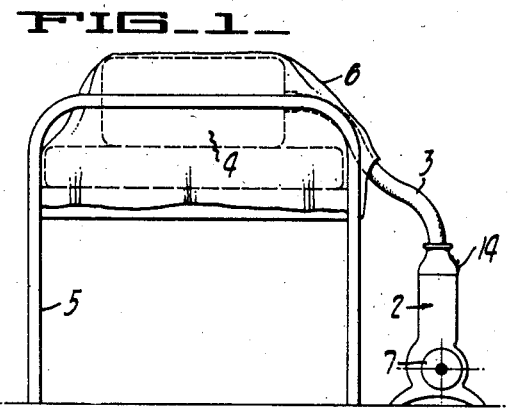
FIG_1_
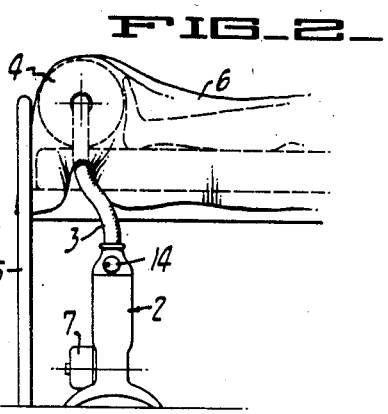
FIG_2_
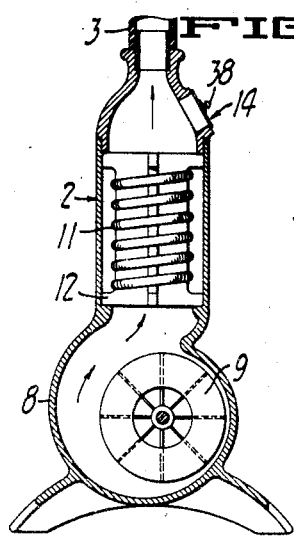
FIG_3_
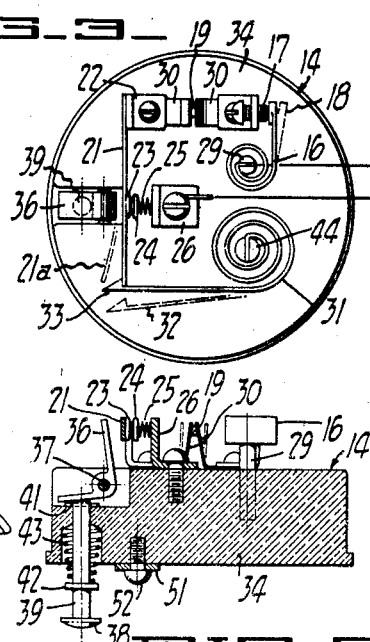
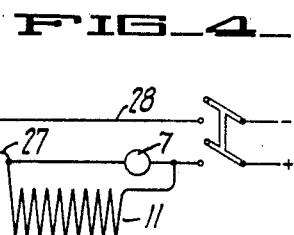
FIG_4_
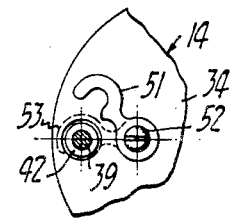
FIG_6_
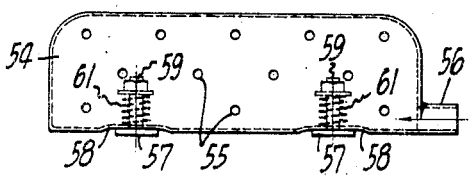
FIG_7_  FIG_5_
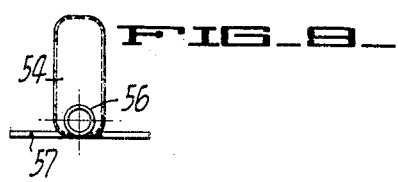
FIG_9_
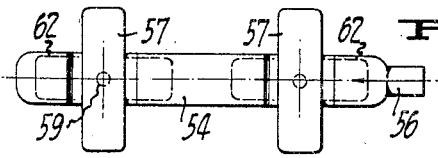
FIG_8_
INVENTOR.
Ernest J Sweetland

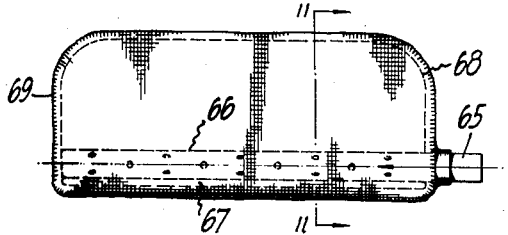
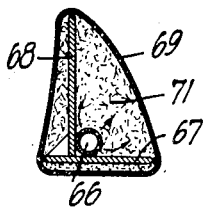
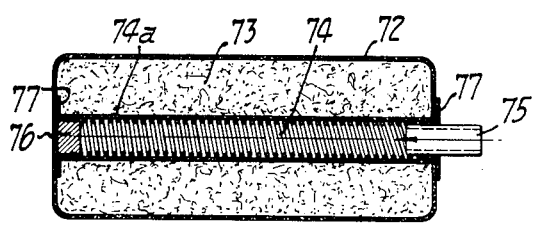
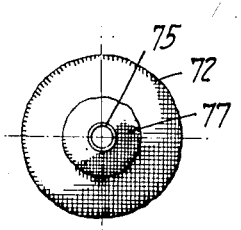
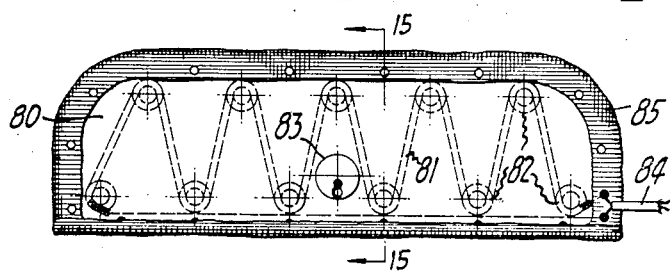
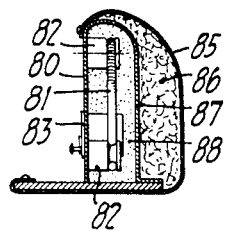
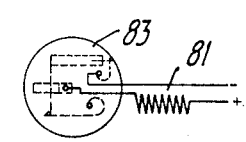
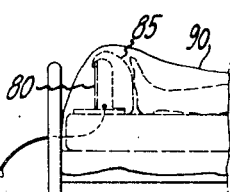
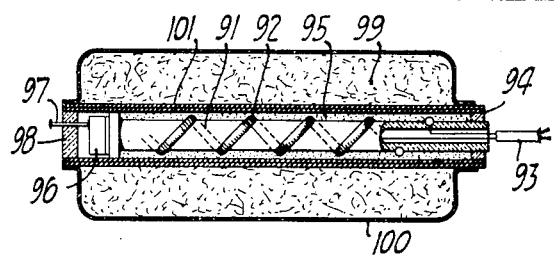
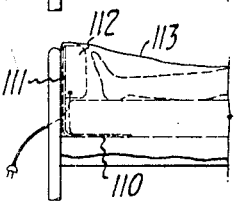
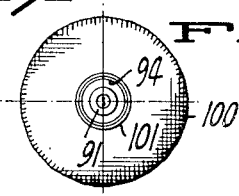

Patented Oct. 21, 1941

2,259,712

UNITED STATES PATENT OFFICE 2,259,712

BED WARMING MEANS

Ernest J. Sweetland, Piedmont, Calif.

Application April 11, 1939, Serial No. 267,300

3 Claims. (Cl. 219—39)

This invention relates to means for warming the body of a person in bed in combination with means for supporting the covers in said bed so as to relieve any desired part of a person's body, especially his feet, of the discomfort caused by the weight of the bed covers. Patients confined to bed for a long period of time, especially those required to wear plaster casts on the legs experience great discomfort from the weight of the bed clothing resting upon the feet. To obviate this difficulty it is customary to place a sort of a cage, sometimes called a "cradle," over the patient's feet to relieve them of the weight of the bed covers. Such a device, while relieving the feet of excess weight, tends to make the bed cooler and it is frequently necessary to supply artificial warmth to the patient's feet. This is usually accomplished with hot water bottles with their attendant disadvantages. My invention provides a combination of means for supporting the bed covers and providing a warmed surface against which the user may rest his feet or any other part of his body in comfort.

While my invention is especially useful in hospitals and the sick room, it has a wide application in the home and may be used wherever local warmth is to be applied to any part of the body.

A further object is to provide thermostatic means in combination with a bed warmer wherein the thermostat cuts off the electric current which produces the heat and leaves the current off permanently until the thermostat is re-cycled by pressing a button. This makes it possible to place the warming means in the bed at the time of retirement and the heat is automatically cut off when a pre-determined temperature is reached, and the heat remains cut off through the remainder of the night or until the thermostat is manually re-cycled. This arrangement is advantageous for the use of many people who require a little additional heat at the time of retiring but after the bed is once warmed they are comfortable for the night without additional heat.

A further object is to provide means whereby the automatic cut off above described may be temporarily held out of commission when it is desired to have the heat remain on until it is manually cut off.

A further object is to provide an air blower and heating element for the purposes set forth in combination with thermostatic means and with a fusible link so situated that it will cut off the heating coil in the event that the motor should stall or burn out or if the air stream rises in temperature.

Another object is to provide a combination cushion or pillow means with heating means whereby such cushion or pillow means serves the double purpose of supporting the bed covers and distributing warm air within the bed. It is pointed out that one of the difficulties encountered in warming beds by means of warm air is that if the nozzle or outlet of the conduit supplying the warm air is obstructed by the bed clothing the air flow is reduced and this tends to increase the temperature, sometimes to a point where it may be dangerous to the person in bed. The cushion or pillow means herein described provides a means of distributing air within a bed that cannot possibly be clogged or interrupted, and the result is a uniform degree of heat which is diffused throughout the large area of the cushion in a manner that protects the user against overheating or having the air stream discharged directly against his skin.

A further object of my invention is to provide a bed warmer with thermostatic control means in combination with a protective link in the electric circuit made of alloy of a low fusing point which link is held constantly in tension by resilient means to insure the rapid and complete breaking of the circuit in the event that the thermostatic control means should be deranged and thus allow the temperature to rise beyond a pre-determined point.

The invention possesses other advantageous features, some of which with the foregoing, will be set forth at length in the following description where I shall outline in full those forms of my invention which I have selected for illustration in the drawings accompanying and forming a part of the present specification. In said drawings, I have shown several forms of my invention, but it is to be understood that I do not limit myself to such forms, since my invention is capable of various modifications which are limited only by the scope of the appended claims.

Referring to the drawings:

Figure 1 is a rear elevation of a bed provided with air warming and cover supporting means.

Figure 2 is a side elevation of the apparatus shown in Fig. 1.

Figure 3 is a sectional elevation of an air warming unit such as is shown in elevation in Figures 1 and 2.

Figure 4 shows a plan view of thermostatic control and fusible link protective means together with a wiring diagram which shows the manner of wiring the apparatus.

Figure 5 is a vertical section substantially on the horizontal center line of Figure 4.

Figure 6 is a fragmentary inverted plan view of the thermostat showing means of holding down the re-cycling button when desired to keep it out of service.

Figure 7 is a side elevation of a combined bed-cover support and warmer.

Figure 8 is an inverted plan view of Figure 7.

Figure 9 is an end elevation of Figure 7.

Figure 10 is a side elevation of a bed-cover support and warmer.

Figure 11 is a cross-section on the line 11—11 of Fig. 10.

Figure 12 is a longitudinal section through a cushion to be used for supporting bed covers and warming the bed.

Figure 13 is an end elevation of Figure 12.

Figure 14 is an end elevation of a combined bed-cover support and warmer provided with a built-in heating element.

Figure 15 is a vertical section on the line 15—15 of Figure 14.

Figure 16 shows wiring diagram of the apparatus used in Figures 14, 15, 18 and 19.

Figure 17 shows a partial section of a bed employing the type of combined bed-cover support and warmer illustrated in Figures 14 and 15.

Figure 18 is a sectional elevation of a modified form of combined bed-cover support and warmer.

Figure 19 is an end elevation of Figure 18.

Figure 20 shows a combined bed-cover support and warmer which is supported in place by a member which extends under the foot of the mattress.

Referring to the drawings in detail, in Figure 1, 2 designates the blower-heater unit which is shown in detail in Figure 3. Power to drive the blower is supplied by the motor 7. 3 is a flexible hose to convey warm air to the cushion 4 which serves the double purpose of supporting the bed covers and providing warmth in the bed 5, and 6 represents the usual type of bed covers.

In Fig. 3 the blower housing 8 encases the fan wheel 9 which is driven by the motor 7 not shown in Fig. 3 but shown in Figs. 1 and 2. The air stream produced by the fan wheel 9 is forced upwardly as indicated by the arrows and passes by the electrical heating coil 11 which is mounted upon the porcelain frame 12 which in plan view is in the form of a cross provided with suitable notches to hold the coil in place. The warmed air current passes through the hose 3 to be discharged into one of the forms of bed warming device to be described in detail further on.

A particular feature of the combined blower and heater unit 2 is the construction and location of the thermostatic control means 14 which is illustrated in detail in Figures 4, 5 and 6. It will be noted that this thermostat is located so that it is affected not only by the air stream passing upwardly, but is also affected by the heat directly radiated from the coil 11. Normally this thermostat is affected only by the temperature of the air current because as long as the air is flowing freely through the coil the temperature of the coil is low enough that the direct radiated heat therefrom is not sufficient to cause the thermostat to function, but if by chance the motor should burn out or the wheel 9 should become jammed, the air current passing through the unit is immediately stopped and the coil becomes hot. When this occurs the radiated heat promptly affects the thermostat and causes it to cut off the main current which flows both through the motor and through the heating coil. The thermostat therefore not only prevents the air currents during the normal operation of the device from exceeding a predetermined temperature, but acts as an important safety device to prevent over-heating and causing damage in the event of stoppage of the air circulation.

Referring to Figure 4, 14 designates the thermostatic unit in its entirety. 16 is a bi-metal thermostatic element which is normally adjusted, by means of the screw 17, to open the circuit and cause the temporary discontinuance of operation of both the motor and heating coil when a pre-determined temperature is reached. The temperature at which this thermostat opens would normally be in the neighborhood of, say, 120 degrees F. The dotted lines 18 indicate the open position of this thermostat. 19 is a link, or seal, of fusible alloy which is designed to melt at a temperature of 170° F. or less. This link forms a connection in the main circuit of the apparatus and is merely an extra precautionary measure to protect the apparatus in the event of failure of the thermostat. It will be noted that the fusible seal 19 is located between a pair of leaves 30 which are made of flat spring stock which are under tension when the seal 19 is intact, but if the seal 19 reaches its melting point, the spring tension in the leaves 30 causes them to spring apart as indicated by the dotted lines. This arrangement makes it possible to use a very small amount of the fusible alloy and the spring tension instantly opens a wide gap in the circuit and thus avoids sparking or other difficulties that might be caused if I depended upon the fused alloy merely to flow away from the points with which it is connected. The leaf spring 21 is fixed on the upstanding arm of the angle piece 22 and is provided with the contact point 23 which contacts with another contact point 24 which is supported by the compression spring 25 which is fixed to the angle piece 26 to which wire 27 is secured. The line wire 28 connects with the post 29 to which the thermostatic element 16 is secured, thereby completing the circuit through the thermostatic device. 31 is another thermostatic element made of bi-metal which expands toward the position indicated by the dotted line 32 as the element becomes hot. At the end of the thermostatic element 31 is a latch 33 which engages the lower end of the leaf spring 21, to hold the contact points 23 and 24 together during the normal operation of the machine, but when the element 31 becomes sufficiently hot to disengage the lower end of the leaf spring 21, the latter due to its resiliency snaps out to the position indicated by the dotted lines 21a thus breaking the connection betwen the points 23 and 24. The spring 25 compresses but slightly and is merely to insure contact of the points 23 and 24 without requiring too delicate adjustment.

Referring to Figure 5 it will be noted that the block of insulating material 34 has a portion cut away to accommodate the reset mechanism which comprises the angle member 36 which is pivotally mounted on the pin 37. The reset button 38 is fixed to the rod 39 at the inner end of which is a pin 41 to prevent the rod 39 from getting out of place. A washer 42 abuts the compression spring 43 which normally holds the rod 39 and button 38 in the position indicated in the drawings. The thermostatic device as above described has three separate and distinct functions, the first being the control of temperature which prevents exceeding a pre-determined maximum temperature by means of the element 16. This element may, if desired, be provided with a dial and hand arrangement in the customary manner used for regulating thermostats, to make it readily adjustable from the exterior of the machine. But in ordinary practice, this element 16 is used only as a safety device to prevent exceeding a given temperature, and I prefer to design the coil 11 of such size and resistance that it delivers the desired amount of heat continuously without causing the element 16 to function, except under unusual circumstances, such as a very hot day when the higher temperature of the air input correspondingly increases the temperature of the output. The second function of the thermostatic control resides in the use of the bi-metal element 31, the latch 33 and the leaf spring 21 and attendant parts. This element is so adjusted by rotation of the post 44 or otherwise that after the temperature reaches a pre-determined point, which is preferably several degrees lower than the temperature at which the element 16 functions, the latch 33 disengages the leaf spring 21 when the apparatus has reached the desired temperature. This breaks the circuit and the unit remains out of service until it is re-cycled by pressing the button 38 after the apparatus has cooled. It is easy to adjust the thermostat so that when the unit 2 and its attendant parts reach a temperature that sets off the latch 33, the warming device in the bed has also reached the desired temperature and the incoming warm air may be shut off for a considerable period of time or for the rest of the night, if so desired.

The third function of the thermostatic unit resides in the safety link 19 which fuses and protects the apparatus against over-heating in the event of failure of the thermostatic elements, or accident to the motor or other parts.

The flat hook member 51 is pivotally mounted on the pin 52 and in the event that it is desired to put the automatic cutout switch which is actuated by the thermostatic element 31 and latch 33, out of commission, the hook 51 is pushed into the dotted position 53 (Fig. 6) after the re-cycling button 38 has been pressed. The hook 51 then engages the outer surface of the washer 42 thereby holding the angle member 36 against the leaf spring 21 whereby the contact points 23 and 24 are held permanently in contact regardless of the action of the thermostatic element 31.

Figure 7 is a side elevation of a hollow metal casing 54 provided with perforations 55 and with nipple 56 to be connected with the warm air delivery hose 3. On the bottom of the casing 54 is a pair of pivotally mounted clips 57. These in the position shown in the drawings traverse the indentations 58 and are held by a pair of bolts 59 each of which is surrounded with a coiled compression spring 61. The reason for mounting the clips in this manner is that when they are in traverse position as shown, the depressions 58 tend to hold the clips firmly in position at right angles to the casing 54, thus providing a supporting base to hold the casing 54 in upright position. But when it is desired to use the casing 54 in a horizontal position for warming purposes the clips 57 may be folded into the dotted positions indicated at 62 in the inverted plan, Figure 8.

Figure 9 shows an end view of the casing 54 and shows how the clips 57 tend to support the casing 54 in upright position for supporting bed clothes and warming the feet.

Figure 10 shows a front elevation of a combination warmer and bed cover support of modified form which will be more clearly understood by reference to the sectional view of same in Figure 11.

In Figures 10 and 11, 65 is the end of perforated tube 66. This nipple 65 is adapted to be coupled with the hose of the blower unit such as is illustrated at 3 in Figure 3. 67 is a base-board to which is secured the upright supporting board 68. These two boards form a rigid angular structure which is surrounded by any suitable porous fabric 69 which encloses the entire unit except the nipple 65. Surrounding the perforated tube 66 and completely filling the angular space is a body of hair, feathers, or other soft porous material 71 which forms a cushion.

Figures 12 and 13 show a form of cushion I may use as a warming element in connection with the apparatus shown in detail in Figures 1, 2 and 3. It comprises a cushion, preferably round, covered with porous fabric 72 and filled with a suitable porous material such as curled hair or feathers as indicated at 73. The nipple 75 which is adapted to be connected to the hose 3 has secured to its inner end a helical coil of spring wire 74 which is surrounded by a flexible cover 74a which is made of porous fabric. A partition member 76 prevents escape of air from the extreme end of the conduit formed by the coiled spring. The coiled spring conduit is held in place by the fabric members 77 which are stitched or otherwise secured to the ends of the cushion. By this construction I provide a cushion which has an air conduit throughout its axis which is covered with porous material for the distribution of warm air throughout the cushion, and since the helical coil 74 is flexible, and is collapsible in a longitudinal direction, it provides a construction which is not easily broken and which does not interfere with the softness and pliability of the cushion in all directions. Such pillows may be made from 3 to 5 feet long if desired and placed lengthwise of the bed, one on each side of a patient. This arrangement is useful in treating shock cases and serves the double purpose of delivering warmth to the patient and supporting part of the weight of the bed covers.

Figure 14 is a side elevation of a modified form of combined bed-cover support and warmer which radiates heat produced in the coil of resistance wire 81 which is supported within the warmer by the porcelain insulators 82. 83 represents a thermostatic control mechanism which may be identical with the one illustrated in Figures 4, 5 and 6, although it is wired in a different manner as is illustrated in Figure 16. 84 is the cable which supplies current to the heating coil.

Figure 15, which is a sectional view on the lines 15—15 of Figure 14 shows a covering 85 of fabric which encloses the device and surrounds the filling material 86 which may be curled hair or the like. Within the interior of the metal casing 87 is shown a body of light fireproof material 88. This is used as a filler and heat retaining material. A suitable material for this purpose is kieselguhr. Its use is not essential to the success of the device and may be omitted or not, as the designer may prefer. In the event that such a material is used, a cover is used to cover the thermostatic mechanism to keep the parts clear of the filling material.

The construction and functions of the thermostatic switch shown in Figure 15 have been illustrated and described in connection with Figures 4, 5 and 6. The wiring diagram in Figure 16 shows the method by which the coil 81 is connected with the thermostat and with the power service line. The same diagram is applicable to the modification shown in Figs. 18 and 19.

Figure 17 shows a portion of a bed and illustrates the mechanism shown in Figures 14 and 15 in use. It will be noted that the upright support 80 supports the bed covers 90 in a manner to provide comfortable foot and leg room for the person in bed while the cushion fabric 85 provides a warm and comfortable support for the feet.

Figures 18 and 19 show a modified form of my invention wherein a cushion or supporting pillow to warm feet is made with a circular cross section with the heating element mounted along the central axis of the cushion. A central porcelain shaft 91 forms a core to support the coil of resistance wire 92 which is connected through the cable 93 to the power source. A tube of asbestos 94 is held in spaced relation with the central core, and a body of fireproof earthen material, such as kieselguhr, fills the space between the two as illustrated at 95. 96 represents thermostatic control and safety link arrangement similar to that described in connection with Figures 4, 5 and 6 except that the re-cycling rod 97 is provided with a long stem to bring it out through the plug 98 and to an accessible position. 99 is a body of curled hair or other cushioning material and 100 is the covering of fabric. As a precaution against breakage the asbestos tube 94 is covered by the metal tube 101.

The use of the apparatus employing warm air is obvious from the illustrations shown in Figures 1 and 2. The unit 2 is plugged into a electrical receptacle which connects the electrical current with both the motor and the heating coil as is shown in the wiring diagram of Figure 4. The heating coil 11 becomes warm immediately and the warm air delivered through the hose 3 is discharged into the interior of the cushion 4 and permeates the entire porous filling of the cushion and eventually diffuses outwardly through the porous cover of the cushion into the bed. Normally the thermostatic element 16 is so adjusted that it does not function during the ordinary operation of the unit because the output of the heating coil 11 which is usually made with a capacity of from 30 watts upward, depending upon the size of the cushion, keeps the cushion 4 at a uniformly satisfactory temperature without the need of thermostatic control. However, if desired, the element 16 may be adjusted to cut in and out frequently so as to maintain any temperature desired, and even though this thermostat is located in the unit 2 there is a definite relation between the temperature therein and the temperature in the pillow so that it is perfectly feasible to make such an adjustment. If the element 16 is so adjusted that under normal conditions it does not function at a lower temperature than that at which the element 31 releases the leaf spring 21, then the element 31 is so adjusted that it causes the circuit breaker 21 to open the circuit after the apparatus has reached the maximum temperature desired which is usually when the apparatus has been running for a period of say approximately 2 or 3 hours. Whenever this circuit breaker functions the apparatus is automatically out of service for the rest of the night or until such time as it is re-cycled by pressing the button 38 and if it is desired to put the automatic circuit breaker out of service then the button 38 is pushed in all the way and the hook 51 is pushed in so that it engages the upper surface of the washer 42 whereupon the angle member 36 holds the leaf spring 21 in closed position as long as desired. Under these conditions the element 16 protects the warmer from exceeding the maximum temperature for which it is set.

It should be understood that the functions of the warming device which utilizes warm air as above described are substantially the same whether the warming and bed-cover support unit used is of the cushion type shown in Figures 1 and 2 or of modified types such as shown in Figures 7 to 13 inclusive.

The operation of the combined warmer and bed-cover support illustrated in Figures 14 to 19 inclusive differs from the preceding description of the air operated unit in that no air circulation is required, the heating coil being enclosed directly within the bed clothes supporting unit. To operate warmers of this type it is merely necessary to place the warmer across the foot of the bed as illustrated in Figure 17 and connect the cable with an electrical receptacle. The coil employed is preferably adjusted to a wattage that will give only the amount of heat desired and this may vary within the range from 20 to 100 watts depending upon the area of the unit. As this modified form of device is equipped with an interiorly situated thermostatic control of the same type that is used in the warm air type the operation will be obvious from a study of Figures 4, 5 and 6 and the foregoing description coupled with the wiring diagram shown in Figure 16.

The use of electrically heated cushion illustrated in Figures 18 and 19 is obvious since the coil 92 is warmed by the current entering through the cable 93 and the warmth is radiated outwardly through the conduit walls and the cushioning material 99.

From the foregoing description, it will be understood that my invention not only provides warmth but provides a warmed surface to impart heat to the patient's body by direct contact therewith. Also, that the warmed cushioned surface may be placed underneath the body or against any portion thereof, direct contact with the warmed surface being the best means of conveying heat to any part of the body, especially to the soles of the feet. My invention is not to be confused with devices used in some hospitals, which are variously known as "bakers," electric tents, electric heating cabinets and the like. Such arrangements usually hold the bed clothing above the patient tent-fashion and do not supply the needs for which my invention is intended.

While I have referred to curled hair, feathers and the like as a cushioning medium, I do not limit myself to these materials as such materials as cotton batting, "kapok," etc. may be used, and in fact metallic wool or ribbon-like metallic filaments may be used where a high degree of heat conductivity through the cushion is desired. Such metallic filaments may be either in loose form or knitted into a fabric and used as a cushioning medium between the outer cover of fabric such as 85 in Figure 15 and the casing wall 87. The casings which are used to support the bed covers and diffuse air in the bed such as are shown in Figs. 7, 8 and 9, may be of metal, or I may use a light construction made of papier-mâché, moulded or formed cellulose fibre or the like; but in the types having a built in heating element, such as shown in Fig. 14 I prefer to make the casing of aluminum because its high heat conductivity tends to equalize the heat over the entire surface of the warmer.

I claim:

1. Bed warming means comprising a substantially cylindrical cushion; a helical spring extending longitudinally through said cushion to form a conduit therethrough; a ferrule at one end of said cushion forming connection with the conduit formed by said spring; a porous cover surrounding said spring; a body of porous filling material between said cover and the cylindrical outer wall of said cushion; said conduit being adapted to deliver and distribute a stream of conditioned air to the interior of said cushion when said conduit is connected to a source of supply of conditioned air.

2. Bed warming means comprising a substantially cylindrical cushion, a helical spring extending longitudinally through said cushion to form a conduit therethrough; connecting means at an end of said helical spring to form connection with an air supply conduit; a porous cover surrounding said helical spring; a body of porous filling material between said cover and the cylindrical wall of said cushion; the conduit formed by said spring and its surrounding cover being adapted to deliver and distribute a stream of conditioned air to the interior of said cushion when said conduit is connected to a source of supply of conditioned air.

3. Bed warming means comprising a cushion; a flexible conduit extending longitudinally through said cushion, said conduit comprising a resilient skeleton member surrounded by a flexible fabric; connecting means at one end of said conduit to form connection with an air supply conduit; a body of porous filling material surrounding said conduit, and an outer covering of porous material to retain said porous filling material in place and to form the outer surface of said cushion, the said flexible conduit being adapted to deliver and distribute a stream of conditioned air to the interior of said cushion when said connecting means is joined to a conditioned-air supply conduit.

ERNEST J. SWEETLAND.